(12) United States Patent  (10) Patent No.: US 6,493,244 B1
Gray  (45) Date of Patent: *Dec. 10, 2002

(54) SYSTEM WITH MASSIVE CHOKE IN PARALLEL WITH A/C LINE FOR LOAD CONDITIONING

(75) Inventor: Richard Gray, New Orleans, LA (US)

(73) Assignee: Richard Gray's Power Co. (A La. Limited Liability Co.), New Orleans, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/856,289
(22) PCT Filed: Nov. 19, 1999
(86) PCT No.: PCT/US99/27549

§ 371 (c)(1),
(2), (4) Date: May 18, 2001

(87) PCT Pub. No.: WO00/31863
PCT Pub. Date: Jun. 2, 2000

Related U.S. Application Data

(63) Continuation-in-part of application No. 09/274,149, filed on Mar. 22, 1999, now Pat. No. 6,198,643.
(60) Provisional application No. 60/109,337, filed on Nov. 20, 1998.

(51) Int. Cl.[7] .................. H02M 1/00; H02M 1/12; H01H 47/00
(52) U.S. Cl. .................. 363/39; 363/146; 361/159
(58) Field of Search .................. 363/39, 50, 142, 363/146; 361/118, 159

(56) References Cited

U.S. PATENT DOCUMENTS 4,218,660 A  8/1980  Carver
4,445,095 A  4/1984  Carver
4,484,150 A  11/1984  Carver
4,517,528 A  5/1985  Tanaka et al.
4,586,002 A  4/1986  Carver
4,594,561 A  6/1986  Grodinsky et al.
4,769,615 A  9/1988  Liberman
4,808,946 A  2/1989  Carver
5,164,991 A  11/1992  Johnson et al.
5,260,862 A  11/1993  Maron ..................... 363/39
5,297,015 A  3/1994  Miyazaki et al. ......... 363/146
5,920,468 A  * 7/1999  Brisson et al. ............. 363/39
6,198,643 B1  3/2001  Gray ........................ 363/39

* cited by examiner

Primary Examiner—Jessica Han
(74) Attorney, Agent, or Firm—Pugh/Associates, Patent & Trademark Attorneys; C. Emmett Pugh

(57) ABSTRACT

A massive choke coil [e.g. exceeding about three henries, with at least a thousand turns and a relatively low internal resistance of about eleven ohms] placed in parallel with the A/C line, that is, preferably across the A/C line's "hot" and "common" lines, quenching the reflected signal (or back emf) that is developed when any power amplifier or other load places its demands upon the incoming A/C power line. Due to its electromagnetic characteristics, the choke tends to provide a momentary high current source of energy when needed by, e.g., a power amplifier (or other appropriate load) when transient demand is called for. The parallel choke approach tends to have a reversing effect on this signal, at least substantially reducing its presence on the A/C line, providing a greatly enhanced A/C power line signal quality, without which the otherwise untreated signals are able to modulate the A/C line.

26 Claims, 8 Drawing Sheets

AC line modulated with
RF frequency without RGPC

AC line modulated with same
RF frequency with addition of RGPC

SYSTEM WITH MASSIVE CHOKE IN PARALLEL WITH A/C LINE FOR LOAD CONDITIONING

REFERENCE TO RELATED PROVISIONAL APPLICATION & PATENT

This is a continuation-in-part application of Ser. No. 09/274,149 filed Mar. 22, 1999, now U.S. Pat. No. 6,198,643 issued Mar. 6, 2001, entitled "System with Choke in Parallel with A/C Line Conditioning," and additionally claims the priority of provisional application Ser. No. 60/109,337 filed Nov. 20, 1998 and the benefits of PCT/US99/27549 filed Nov. 19, 1999.

TECHNICAL FIELD

The present invention relates to an electrical system for improving the quality of electrical power that is fed into electronic or other electrical equipment or into electrical or electronic components within electronic or electrical equipment. More particularly, the present invention is directed in general to usage on A/C operated devices, preferably audio power amplifiers and pre-amplifiers, televisions (TVs), recording studio amplifiers for musicians, computers, computer peripherals, electrical motors, air conditioners or other appliances, major and minor, and other such electronic and electrical equipment, but not limited to them exclusively. The present invention provides an effective interface for coupling electronic and other electrical components to the A/C line, effectively placing the electric utility transformer closer (from an electrical stand-point) to the electrical or electronic equipment receiving the A/C power. The invention further provides a quenching effect on line noise being produced by the equipment itself, which might effect other equipment sharing the same A/C power, and provides a relatively high current source and stores energy for, for example, power-hungry transients required by, for example, large power amplifiers in audio sound equipment and the like, without any of the "trade-offs" of traditional power line conditioners.

BACKGROUND ART

A listing of prior patents, known to the inventor and which may be relevant to the invention, is presented below:

| Patent No. | Patentee(s) | Issue Date |
| --- | --- | --- |
| 4,218,660 | Carver | 08/19/80 |
| 4,445,095 | Carver | 04/24/84 |
| 4,484,150 | Carver | 11/20/84 |
| 4,517,528 | Tanaka, et al | 05/14/85 |
| 4,586,002 | Carver | 04/29/86 |
| 4,594,561 | Grodinsky, et al | 06/10/86 |
| 4,769,615 | Liberman | 09/06/88 |
| 4,808,946 | Carver | 02/28/89 |
| 5,164,991 | Johnson, et al | 11/17/92 |

These patents generally are directed to audio amplifiers with transformer couplings, a completely different approach than that of the present invention which places an appropriate "choke" coil in parallel with the A/C power line, that is, across the A/C's "hot" and "common" or "neutral" lines.

The present invention is directed in general to usage in connection with A/C operated, electric or electronic equipment, preferably, for example, audio power amplifiers and pre-amplifiers, televisions, computers, computer peripherals, recording studio amplifiers for musicians, and other such electronic component equipment or other electrical equipment or devices, for example, electrical motors, air conditioners and other major and minor appliances, but the principles of the invention are even more broadly applicable.

It is noted that power amplifiers (and other high transient demand loads) and pre-amplifiers when providing an output signal to either the speaker (in the case of a power amplifier) or power amplifier (in the case of the pre-amplifier) tend to produce an undesirable, much smaller, mirror image of the signal that they are processing that modulates the A/C line source.

As an effective cure to this problem, the parallel choke approach of the invention, due to the fact that it must be magnetically charged by electricity [either from the A/C line or back electromotive force (emf) from it's load] tends to have a reversing effect on this signal, preventing, eliminating or at least substantially reducing it's presence on the A/C line, thereby providing a greatly enhanced, stablilzed, A/C power line signal for the load. Without the choke of the present invention, the otherwise untreated signals are able to modulate the A/C line, as it is resistive (basically a wire going from the utility services transformer to the wall outlet that the load(s) is/are plugged in to).

Up to now, with very few exceptions, virtually all line conditioners have been a major compromise when used in a line enhancement mode. They will in most cases remove small amounts of line noise generated on a given line by such things as motor starting, small transient disturbances and rarely radio frequency (RF) interference imposed on the line. They do this typically by placing small capacitors and air core or ferrite core chokes in series with the line, along with, for example, a metal oxide varistor (for surge suppression). This provides a low cost (high profit) solution to a very small problem.

In the last few years, research has shown that line borne interference is not the major cause of problems in, for example, audio systems. Further research has shown this to be true of other types of applications as well. It has been found that the equivalent series resistance (ESR) of the line is as critical as it would be in capacitive applications. This ESR is greatly aggravated by the majority of line conditioners, as they place resistive elements in series with the source and the load (the wall outlet and the amplifier). As such, when an amplifier hook-up attempts to produce an audio signal, it must discharge the capacitors contained in its power supply into the speakers. This audio signal is then used to modulate the speakers.

But, if one considers basic physics—for every action, there is an equal and opposite reaction. In the case of an amplifier, the opposite reaction is the modulation of the power supply. No matter how large the power supply is, this modulation is unavoidable. In other words, part of the audio signal is imposed upon the line feeding the amplifier. This signal is then imposed upon other pieces of equipment in the system as well. Isolation transformers cannot stop this type of modulation, as they generally are barely large enough to keep up with the load they are supplying.

Now taking this analysis a few steps further, one should consider the amplifier as a large electric motor. When it tries to start, it produces a significant inverse transient on the line. As it spins up, this load lessens and the line then regains its amplitude. In the case of an electric motor, full rotor speed is (crudely put) the same as an amplifier idling, waiting for a signal. As the load engages the motor, it tends to become a greater load to the line and demands more current. As the audio signal is amplified by an amplifier, its power transformer becomes more of a load, and, therefore, places more of a load on the line.

To make matters worse, while the amplifier is struggling to deal with a resistive line and the further added resistance of any kind of line conditioner placed between it and the A/C receptacle, it is being subjected to all of the other components' noises as well. To give an example of this, consider that a CD player is infusing various kinds of high frequency noise generated by its internal clock, as well as its processing circuitry. A VCR is as guilty as the CD player, as it probably uses a switch mode power supply and plenty of digital processing as well. If one is using a surround sound receiver and a television, the amount of noise is compounded in a source-by-source fashion.

It should be kept in mind that a prior art line conditioner does little or nothing to correct this kind of problem, and, as stated earlier, usually adds to the problem.

The present invention does much in the way of removing the effects of these problems. The exemplary embodiment herein actually provides a transient power supply when the need arises, as well as a blocking effect to the problems that are caused by the operation of electrical devices. It should be understood that, unlike power conditioning units and any transformer coil(s) used therein, the coil used in the present invention is not in series with the A/C line but rather is in parallel across the line.

Once one or multiple "choke coil" units is cascaded or "piggy-backed" or otherwise installed, the exemplary embodiment of the present invention effectively removes much of the problems caused by the ESR in the line and quenches much of the noise produced by the rest of the equipment as well. Bass signals becomes much clearer, imaging is improved, the color becoming richer and more life-like. In apartment buildings where electrical loading is a serious problem, as well as older houses that have marginal power connections, the exemplary embodiment of the present invention will have an even more dramatic effect.

With respect to computers and their peripherals, particularly a high usage piece, such as, for example, a laser printer that tends to produce problems when the fuser comes on, or such as, for further example, a copy machine that does essentially the same thing, the exemplary embodiment of the present invention make a great difference.

It should be understood that, although the foregoing analysis is directed primarily to audio equipment and the like, as an exemplary application, the benefits are similar in many other electrical/electronic applications.

Two additional patents considered in the parent application were U.S. Pat. No. 5,297,015 (issued May 22, 1994) entitled "Power Supply Control System" assigned to Hitachi, Ltd. of Japan, and 5,260,862 (issued Nov. 9, 1993) entitled "A-C Power Line Filter" assigned to Constant Velocity Transmission Lines, Inc. of Auburn Calif.

The Marsh invention is directed to a network (namely multiple ones) of frequency filter sub-circuits ganged in parallel to one another across the A/C line, each of which filter sub-circuits includes in series:

in all of its embodiments a capacitor serving a key filtering function, and an inductive coil with an open air core (FIGS. 3+), likewise serving a key filtering function, the capacitor and the inductor cooperating together to perform the filtering, and in most instances (FIGS. 4+) a resistor (termed a RLC circuit), which frequency filtering network is described as collectively filtering out frequencies ("noise") above 60 Hz.

The values of the inductances are described in its only detailed embodiment (FIG. 9) as being in the relatively minute range of 0.5, 0.19 & 0.1 mh (milliheneries, i.e., thousandths of a henry, or, noting the presence of the decimal point, from 1 to 5 ten-thousandths of a henry (see column 3, lines 63–65). This is in stark contrast to the "massive" (all claims) inductor coil of the disclosed embodiments of the Gray application which has an inductance of at least one henry (a comparative factor of about 1:10,000!) or more preferably at least 3 heneries (a comparative factor of about 1:30,000!) [Claims 5, 14, 23 & 24], with the massive coil core filled with magnetic or ferrous material with no capacitive element in its circuit at all.

Of course, in the context of the Gray invention and the Marsh patent, a factor of about 10,000 is not merely one of degree but rather one of kind. Additionally, the presence of a capacitor in series with the massive Gray inductor would be deleterious to its operation, preventing it from operating as described and claimed in this PCT application; the same is likewise true of adding a resistor in series with the capacitor and the inductor as taught in the Marsh patent.

In addition to these tremendous circuitry differences, the 60+ Hz frequency filtering function of the Marsh patent is neither the function, operation or effect of the present invention, which "(quenches) the reflected back emf signal that develops when the electrical device load places its demands upon the incoming A/C power source line." Additionally, unlike the frequency filtering network of Marsh, in the Gray invention, "the electromagnetic characteristics of (the) massive inductive coil tend to provide a momentary high current source of energy when needed by the device load when transient demand signal is called for", and "also tend to have a reversing effect on the. signal, at least substantially reducing the presence of the signal on the A/C line, providing a greatly enhanced A/C power line signal quality, without which the otherwise untreated signals would be able to modulate the A/C line". Likewise the Gray uses the "coil to substantially reduce, if not eliminate, the resistive effects of the wiring between the electrical device load and the (utility company's) power transformer."

The relatively non-existent inductance, measured in the ten-thousandths of a henry, of the Marsh coils with its capacitors respectively in series are unable to perform these operations or effects. The presence of the capacitor in series with the "inductor" isolates the inductor, preventing the claimed "quenching" effect of the Gray invention, and the presence of the series resistors provide a way for the emf to remain on the line in Marsh. The Marsh coils absorbs radio frequency energy in its filtering, while the Gray massive coil with its core of magnetic material stores magnetic energy. The minute amount of inductance and the presence of an air core in each of Marsh's coils, which are immediately and easily saturated in the presence of, for example, 60 Hz A/C, do not allow them to store any significant energy, and therefore they cannot "substantially reduce, if not eliminate, the resistive effect of the wiring between the (utility company's) transformer and the load." The Marsh circuit does not provide any current available to do anything, much less the specific operations of the Gray circuit. Indeed the Marsh circuit with its capacitors works against the alternating nature of the A/C line source, while the Marsh circuit performs its frequency filtering operation, while the Gray circuit, without any capacitor in its massive inductor line, allows and does not significantly hinder the rise and fall of the A/C power and actually through its "flywheel" characteristics or effect encourages the A/C line characteristics.

Ii is noted that the '862 patent initially illustrates and describes a relatively simple circuit that has only one inductor coil (likewise in series with a capacitor) placed across the load between the AC power source and a load (note FIG. 1) and then presents a "test," which is graphically illustrated in FIG. 2, showing the impedance characteristics of the circuit, plotted against frequency, having a resonant frequency of "$F_R$" some where above 60 Hz, with the circuit being capacitive in nature at frequencies below $F_R$ and inductive above $F_R$. Although the circuit of FIG. 1 of the '862 patent may superficially appear to be somewhat similar to the circuit of FIG. 1 of the instant PCT application, the embodiments of the present application, as noted above, do not include a capacitor in series with the massive inductive coil in its placement in parallel across and between the AC power source and the load. Additionally, the embodiments of the present application each include a core of magnetic material, while the inductor L of FIG. 1 of the '862 patent does not, but rather is an "open ail" coil.

Additionally, the '862 patent does not include the circuit of FIG. 1 as part of its invention, using it apparently only as "background information,." and does not suggest that the circuit of FIG. 1 has any practical use at all!

Instead, as noted above, the Marsh patent is directed to a frequency filter network, using a multiple number of a capacitor/inductor in series, filtering sub-circuits of different frequency filtering characteristics (sometimes with an added series resistor and still in another embodiment a resistor in parallel to the inductor) in parallel to each other, to filter out frequencies ("noise") above 60 Hz. Several different embodiments of the "862 invention are shown in FIGS. 3, 4, 7 & 9, with their respective characteristics graphically illustrated in the other figures.

This ganged frequency filtering is not the approach of the Gray invention, which is directed to a totally different operation using a substantially different inductive circuit with a massive coil having a core of magnetic material.

Thus, the Marsh patent does not at all teach or suggest the present invention. As further discussed below, the '015 Hitachi patent does not cure the Marsh deficiencies with respect to the present invention, and the combination of the two patents likewise do not fairly teach or suggest the present invention.

The Hitachi '015 patent, nearly 50 pages in length, is directed to a relatively complex, "power supply control system" circuit in which there are a multiple number of loads with varying power input specification needs. All relevant circuits which use any form of a coil and a core illustrated in the fifty (50) figures of the patent only show only the use of a transformer (22/66) circuit, that is a coil with both primary and secondary windings positioned in series between the AC power source and the load(s). As noted in column 1, lines 27–31 of this patent and as is well known— "A conventional power supply system for distributing large power to a plurality of loads . . . supplies power from a commercial AC system to a load through a transformer". This, or course, is not like the circuit of the Gray invention which has only a single, continuous, inductor coil with only two terminal connecting leads and a magnetic material core placed in parallel across and between the AC source and the load(s)

The invention of the '015 patent is designed to avoid the need of using different power conversion means to convert power into a form necessary for a particular load (such as, e.g., using individual switching power supplies, AC-DC converters, etc. as practiced in the prior art). It does this by including between the commercial AC power supply and the load a power supply control system including power conversion means and an interconnected control means which varies the power conversion means based on the power specification needs of the loads (FIGS. 47 & 48 provide the simplest illustration of this concept). In one embodiment through information means the load provides power specification needs to the system, which evaluates the needs and varies the power conversion means to provide the needed spec power.

This load-spec-informational/output-control approach of the '015 patent is not what the Gray invention provides or even what Marsh's frequency filtering network provides. Indeed, it appears that there is basically nothing in common substantively between the disclosures of the '015 patent and the present, Gray invention or the Marsh patent. It thus appears that the Hitachi patent is not at all relevant on the issue of asserted "obviousness."

Although the Hitachi patent does illustrates a DC output filter circuit 23F, the "reactor" coil 25A is placed in series in one leg of a then DC power line and is used with a capacitor 26A across the DC power line legs (FIGS. 3A & 3B and column 8, line 51+; reactor 25 & capacitor 26, respectively, in FIGS. 10, 12 & 13), and this part of the Hitachi circuit and its operation and purpose are so diverse from either the Gray invention or the Marsh patent, it still appears to of no significant relevance to either the teachings of the Marsh patent (and its deficiencies with respect to Marsh teaching or suggesting the Gray invention) or the Gray invention itself. Regardless, any fair or reasonable combination of the two cited patents would not produce or teach the Gray claimed invention.

Thus, it would appear that the '862 and the '015 patents, whether taken individually or together in any fair combination, do not fairly suggest or teach the Gray invention, and that the Gray invention should be considered "unobvious" and hence patentable over these two patents.

General Summary Discussion of Invention

Thus, the choke of the present invention, when placed in parallel with the A/C line as taught herein, provides a means of quenching the reflected signal (or back emf) that is developed when any power amplifier or other load places it's demands upon the incoming A/C power line. It also, due to the electromagnetic characteristics of the choke, tends to provide a momentary high current source of energy when needed by, for example, a power amplifier (or other appropriate load) when transient demand is called for.

The preferred approach of the present invention places an appropriate "choke" coil in parallel with the A/C power line, that is, preferably directly across the A/C's "hot" and "common" lines. The coil preferably is relative massive but with relatively low ohmic resistance. To achieve this massiveness, the coil should have a thousand plus turns of wire (for example, about 1,310 turns) or its electrical equivalence, taking into account, for example, the gauge and conductivity of the coil wire, while having a relatively low internal resistance of less than one hundred (100 Ω) ohms, for example, more preferably about eleven (11 Ω) ohms. Such internal resistance is substantially less than most, if not all, of the equipment with which the coil will be used The present invention provides an effective interface coupling electronic components to the A/C line, effectively placing the electric utility transformer "physically closer" (in an electrical sense) to the electronic equipment, substantially improving the quality of electrical signal the electrical or electronic components "see". The invention further provides a quenching effect on line noise being produced by the equipment itself and also provides a relatively high current source and stores energy for power-hungry transients required by, for example, large power amplifiers in audio sound equipment and the like, without any of the "trade-offs" of traditional power line conditioners.

A review of the following will provide further clarifying information on the invention and its workings or mode of operation.

Improvements to Television Pictures

A television is probably one of the most complex loads an average consumer will ever place upon an A/C power line.

The modern television, compared with the older types of TVs, contain much more active circuitry. Technicians are constantly confronted with the statement:

"my old set lasted a lot longer and gave me no trouble. Why do I have more trouble with these newer sets?"

If one considers what is going on in the new televisions, then one better understands, not only why new TVs break more often, but why the new (as well as the old) can benefit from the present invention.

Without the use of the present invention, a new, full feature television is a very complex load. When the set is "off" or in "standby", as the state most of the newer sets resort to when they are turned "off", typically the primary, if not only, circuitry operating is a small on-board computer, a switched mode power supply and, in some cases, a few relays that are used to select input functions.

Thus, this "standby" situation alone can impose a signal upon the A/C power line. The TV's power supply is operating at minimum duty cycle, it's switching pulses are short in duration. The computer has it's clock operating and is awaiting commands. This provides at least two signals which are imposed upon the A/C power line even when the TV is "off". So much for the diligent audiophile who turns his/her television "off" (standby) before listening, thinking that all interfering or line disturbing signals from the TV are "off".

One should then also consider what occurs when the television is turned "on", and, for example, the associated home theater is completely engaged. First, the main oscillator is activated by the on-board computer. This excites the horizontal circuitry, which is used to produce not only the high voltage and high amplitude waveforms that are needed for CRT scanning, but also the scan type power supplies used to power the other circuitry. Vertical sweep is now started, usually provided by a master oscillator divided by other circuitry and then amplified by a small power amplifier, which is then coupled to the deflection circuitry.

While all this occurs, color circuitry is operating, as well as video and the delay circuitry. Audio, usually treated as a "stepchild," is also brought on at this point, or as soon as a signal is detected from the tuner and mute is released.

As the television reaches full function, all of the circuitry just discussed is now imposing it's noise upon the main power supply, and it, in turn, places it's noise and all the rest (in smaller amounts) also upon the A/C power line, which, of course, is servicing other electrical loads and electronic components.

The "surround sound" decoder, line doubler (in the case of big screen types) and all of the associated audio support pieces likewise all have their signals imposed on the A/C power line. This can, in some cases, actually become noticeable in the degraded quality of the audio and picture that the system can produce.

Effects of the Present Invention

The present invention can effectively prevent the components from cross-talking on the A/C power line. Not only do all the components benefit from the reduction of this cross-talk, but the power supplies on all of the associated equipment perform more effectively and efficiently. The lost signal (i.e., lost in the line and confused with other signals) is now presented to the viewer in dramatic fashion. The color is truer, as well as the overall detailing of the picture is improved.

Additionally, for tube (versus solid state) equipment, used, for example, in amplifier circuits, the tubes tend to run cooler and last longer, effectively extending the service life of the equipment.

Test demonstrations on lower-end televisions with an embodiment of the present invention showed that the invention provided dramatic effects, as well as when used on high end and projection type television.

It is noted that, because the main A/C supply is simply an error corrected type of supply, the error must actually be present long enough for the error correction circuitry to detect and process the information, this being controlled by the time constant of the feedback loop contained in the power supply. Before the correction can occur, the signal that is creating the error is passed along to the capacitor supply that resides in the main supply, this capacitor being depleted of a good deal of it's charge before the duty cycle of the power can correct for this.

Without the present invention, the horizontal sweep frequency, (which appears as an error to the main A/C supply under high demand, as described earlier), the main power supply switching frequency and the variation of its duty cycle as it tries to correct for the added load from a bright scene (also described earlier) are now all passed along to the primary power source, namely, the A/C line. Once the television returns to a more average type of picture, the power supply once again passes errors along to the A/C power. line.

Since the power supply is working at an increased duty cycle, once the load on it is reduced, the error correcting circuit must once again detect the lessening of the load and compensate for it. This is passed on to the line also, but as a momentary lessening of the load or an inverse fingerprint.

Once the embodiment of the present invention is installed on the A/C power input line, these "fingerprints" are greatly reduced. Also, the main power supply has a greater amount of energy to draw from, thus aiding in reducing the errors passed through the power supply, giving the error correction circuitry much less work to do. (It should be remembered that, if the signal is imposed upon the line, the power supply must work to compensate for it, as well as the primary error or "demand" imposed upon it.)

The more of today's components (e.g., line doublers, super tube and big screen televisions, high resolution and multi-function VCR's, high power audio amplifiers, surround sound decoders, laser disk and DVD, remote controlled pre-amps, cable and satellite receivers, etc.) that are installed in homes and business, the more the present invention becomes a necessity. Since all of these products all produce their own electrical "fingerprint," a line supply that is resistive like that found in most homes is quite ineffective. As the line is further worsened by many of the "line conditioners" that abound on the present market, these fingerprints become more and more evident.

The preferred embodiment of the present invention effectively removes or quenches most of the signals modulating the A/C power line, as well as providing a very high short term type of power supply for the more demanding of those components.

In the case of the larger screen televisions, a bright scene will usually place quite a demand upon the power supply, as well as the high voltage supply. Since the high voltage supply is operated as a form of switched mode supply and under a heavy load, it passes its demands along to the main supply, and it too, in many cases, is another form of switched mode power supply.

Considering that as the main supply is simply an error corrected type of supply, the error must actually be present long enough for the error correction circuitry to detect and process the information, this being controlled by the time constant of the feedback loop contained in the power supply. Before the correction can occur, the signal that is creating the error is passed along to the capacitor supply that resides in the main supply, this capacitor being depleted of a good deal of it's charge before the duty cycle of the power can correct for the error.

Without the present invention, the horizontal sweep frequency, (which appears as an error to the main supply when high demand, as described earlier) the main power supply switching frequency and the variation of it duty cycle as it tries to correct for the added load from a bright scene (also described earlier) are now all passed along to the primary power source, namely, the A/C line. Once the television returns to a more average type of picture, the power supply once again passes errors along to the A/C line. Since the power supply is working at an increased duty cycle, once the load on it is reduced, the error correcting circuit must once again detect the lessening of the load and compensate for it. This is passed on to the line also, but as a momentary lessening of the load or an inverse fingerprint.

Once the preferred embodiment of the present invention is installed on the line, these "fingerprints" are greatly reduced; also, the main power supply has a greater amount of energy to draw from, thus aiding in reducing in the errors passed through the power supply, giving the error correction circuitry much less work to do.

All of this only explains the horizontal sweep demands and its problems with operating on an adequate A/C line. As the line becomes more and more poisoned by the resistance within it, enabling the modulation of itself by the loads imposed upon it, one must consider the effects of having an entire audio/video home theater and possibly other loads (air conditioning, etc.) upon the line as well.

BRIEF DESCRIPTION OF DRAWINGS

For a further understanding of the nature and objects of the present invention, reference should be had to the following description, taken in conjunction with the accompanying drawings, in which like reference numbers are used and wherein:

FIG. 5A is a frontal view of an oscilloscope screen showing the exemplary AC line modulated with RF (radio frequency) frequency without an exemplary embodiment of the invention attached to the AC circuit; while

EXEMPLARY MODES FOR CARRYING OUT THE INVENTION

Figure 1:
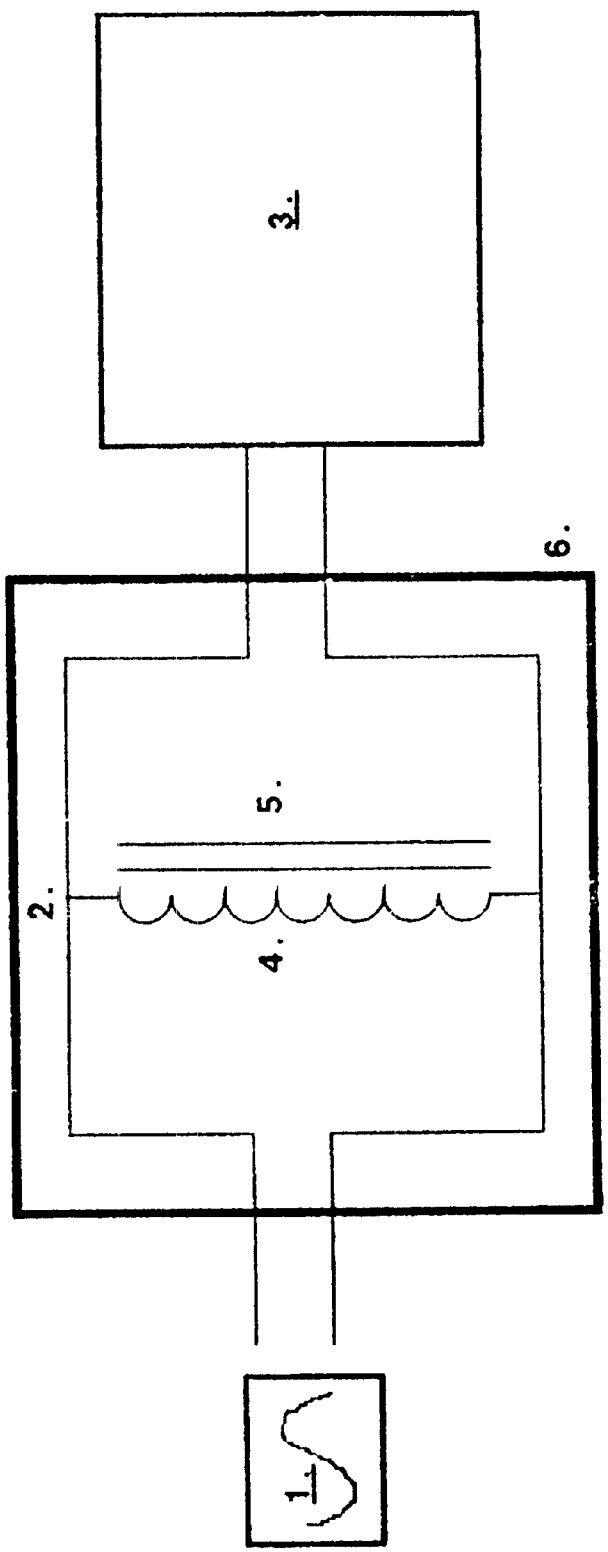
FIG. 1 is a schematic of an initial, exemplary, simplified embodiment of the present invention, showing its very basic elements and the system's imposition between and interconnection to the A/C power line and the load for which the A/C power is being treated by the invention.

As can be seen in FIG. 1, the simplified embodiment of the choke system 10 of the present invention, when placed in parallel with the A/C line 1, provides a means of quenching the reflected signal (or back emf) that is developed when any power amplifier or other like load places it's demands upon the A/C line. It also, due to the electromagnetic characteristics of the choke 2 (having, for example, an iron core), tends to provide a momentary high current source of energy when needed by a power amplifier (or load) 3 when transient demand is called for.

An exemplary load 3 comprises, for example and preferably, an audio, "hi-fi" type component, particularly an audio amplifier or a pre-amplifier, but the system of the present invention is applicable to many other types of electrical or electronic loads as well.

Power amplifiers (and other transient demand type loads) and pre-amplifiers, when producing an output signal to either the speakers (in the case of a power amplifier or receiver) or power amplifier (in the case of a preamplifier) tend to produce a much smaller mirror image of the signal the component or equipment 3 is processing that modulates the A/C line source 1. The choke 2 of the invention, due to the fact that it must be magnetically charged by electricity (either from the A/C line 1 or the back emf from its load 3) tends to have a reversing effect on the signal, preventing its presence on the A/C line, thereby providing a greatly enhanced line for the load 3.

Without the choke 2 of the invention, the signals would be able to modulate the A/C line, as it is resistive (basically the resistance of the length of wire extending from the utility services transformer [e.g. the transformer on the electric utility pole outside the residence or other building in which the load is located) to the wall outlet into which the load(s) is plugged].

The choke 2 of the simplified embodiment of the invention of FIG. 1 includes a coil 4 formed, preferably, from is a single winding of copper wire on a "EI" type iron core 5. The choke 2 produces a minimum of, for example, about one (1) henry or greater [most exceeding about three (3) henries].

When placed in parallel to the A/C line source 1 and the load 3, as illustrated, the core 2 becomes magnetized whenever the A/C line voltage is not at the zero volt crossing point. Since the core 2 is not capable of permanent magnetization, it returns to a state of non-magnetization, unless the load 3 is providing a back electromotive force ("back emf") signal to it, therefore enabling it to turn that signal into magnetic energy, as well as reflect the signal back to the source.

The coil 4 preferably is made of copper wire, with an internal resistance less than, for example, about one hundred (100 Ω) ohms [preferably greatly less, for further example, about eleven (11 Ω) ohms on larger, more preferred models]. The core 2 comprises a standard iron type core, for example, an "EI" core. Alternatively, for further example, a torroidal-type core providing the same properties could be used, among other possible type of cores. The core 2 is laminated, with each core element (in the "EI" type) extending around the coil to provide for enhanced magnetization of the core 5. Typically the choke 2 would be housed in an appropriate housing 6 (note phantom lines).

Figure 2:
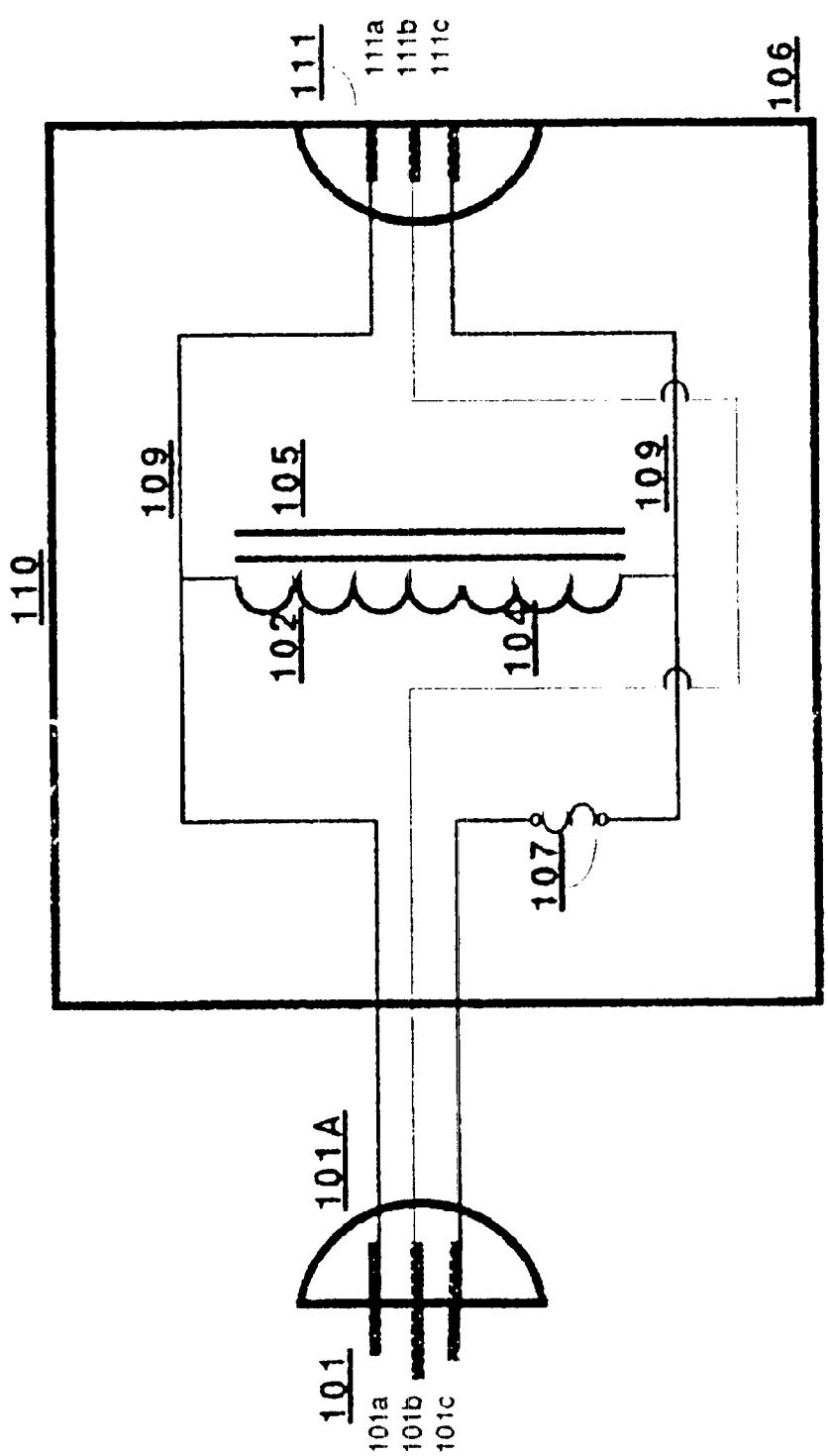
FIG. 2 is a schematic of a second embodiment very similar to the simplified one of FIG. 1 but with supplemental, interconnect elements separately housed for connecting the embodiment of the invention between an exemplary, separate electrical or electronic piece of equipment (e.g. an audio amplifier or pre-amplifier) and the electrical utility's A/C power line as it typically exists in a house or other building.

With reference to FIG. 2, the basic elements (2→102, 4→104 & 5→105) of the basic embodiment of FIG. 1 are included in a housing 106, which housing includes a cord with a standard type, three (3) prong (common, hot & ground), A/C power plug 101' at its end, for plugging the system 110 into a standard, A/C power wall socket 101 (well known and not illustrated for simplicity purposes). An internal, protective fuse 107 is included, while on the other side of the housing 106 there is included a three (3) prong (common or neutral, hot & ground) A/C receptacle or socket 108, into which the electrical or electronic load 103 is plugged via a standard-type, three (3) prong, A/C plug. Appropriate, interconnecting wiring is provided as schematically illustrated in FIG. 2.

Figure 3:
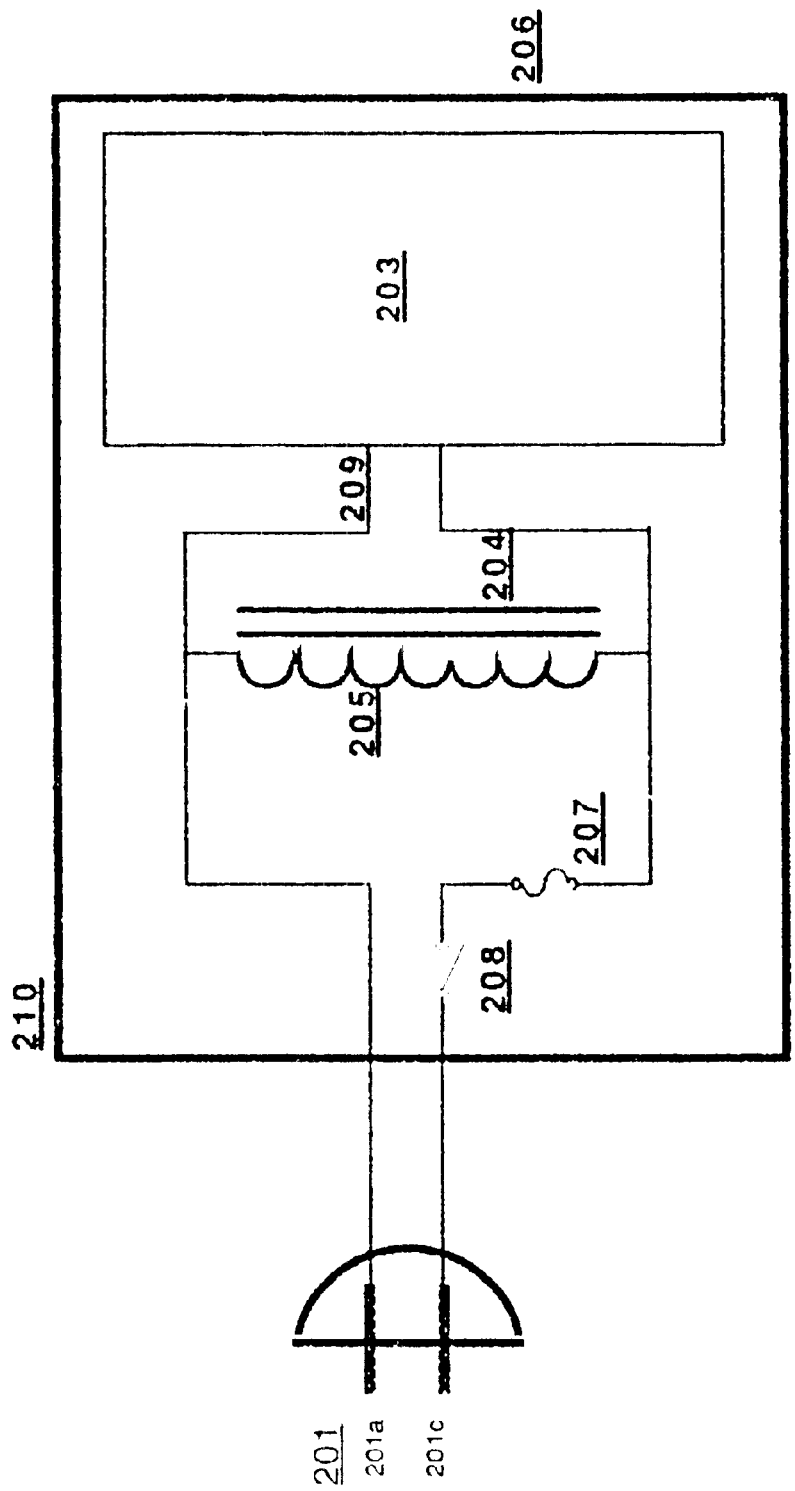
FIG. 3 is a schematic of a third embodiment, similar to that of FIG. 2, but with the basic elements of the embodiment commonly housed with the exemplary electrical or electronic components (e.g. an audio amplifier or pre-amplifier) in the same housing, i.e. structurally integrated with the components in physically the same, common housing.

Now with reference to FIG. 3, the basic choke elements (2→202, 4→204 & 5→205) of the basic embodiment of FIG. 1, in similar fashion to that of FIG. 2, are included in a housing 206, but in this instance the housing is the same one housing the electrical or electronic load components 201 (e.g., the components of an amplifier, pre-amplifier, TV, CD player, computer, computer peripheral, etc.), that is the components 203 and the choke 202 are structurally integrated together within a common or combined housing having a cord with a standard type, three (3) prong (common, hot & ground), A/C power plug 201' at its end, for plugging the system 210 into a standard, A/C power wall socket 201 (well known and not illustrated for simplicity purposes). An internal, protective fuse 207, along with an "on/off" switch 208. Because of the common housing integration of the choke 202 and the load components 203, no A/C plug/socket interconnect between them is necessary.

Appropriate, interconnecting wiring is provided as schematically illustrated in FIG. 3, including the core/component interconnecting wires 209 which in essence serve as the A/C power input to the component's electronics 203 comparable to the interconnecting wires 109 of FIG. 2. Thus, it should be understood that the choke 2/102/202 is placed across the wiring lines 9/109/209, respectively, in parallel with the incoming A/C power lines 1/101/201 (hot to hot, common to common), respectively.

As generally noted above, the exemplary system 10/110/210 of the present invention provides an effective interface, coupling electronic components to the A/C line 1/101/201, effectively placing the electric utility transformer "physically closer" (in an electrical sense) to the electric or electronic equipment or components 3/103/203 involved, substantially improving the quality of the electrical signal that the electrical and/or electronic components of the equipment actually "see". The exemplary system 10/110/210 further provides a quenching effect on line noise being produced by the equipment or interconnected components itself/themselves and also provides a relatively high current source and stores energy for power-hungry transients required by, for example, large power amplifiers in audio sound equipment and the like, without any of the "trade-offs" of traditional power line conditioners.

As noted above, FIG. 4A is a generalized, schematic illustration of exemplary homes 301, 302 & 303 in an exemplary neighborhood 300 connected into and being driven by a utility power transformer 304 exemplifying a typical neighborhood situation, with the third home 303 showing an exemplary room 305 with exemplary A/C electrically powered home entertainment components, including audio equipment 306 and TV 307, and an air conditioner ("A/C") 308, as exemplary (but hardly exhaustive) electrical device load applications for the exemplary embodiments described above with reference to FIGS. 1–3.

Figure 4A:
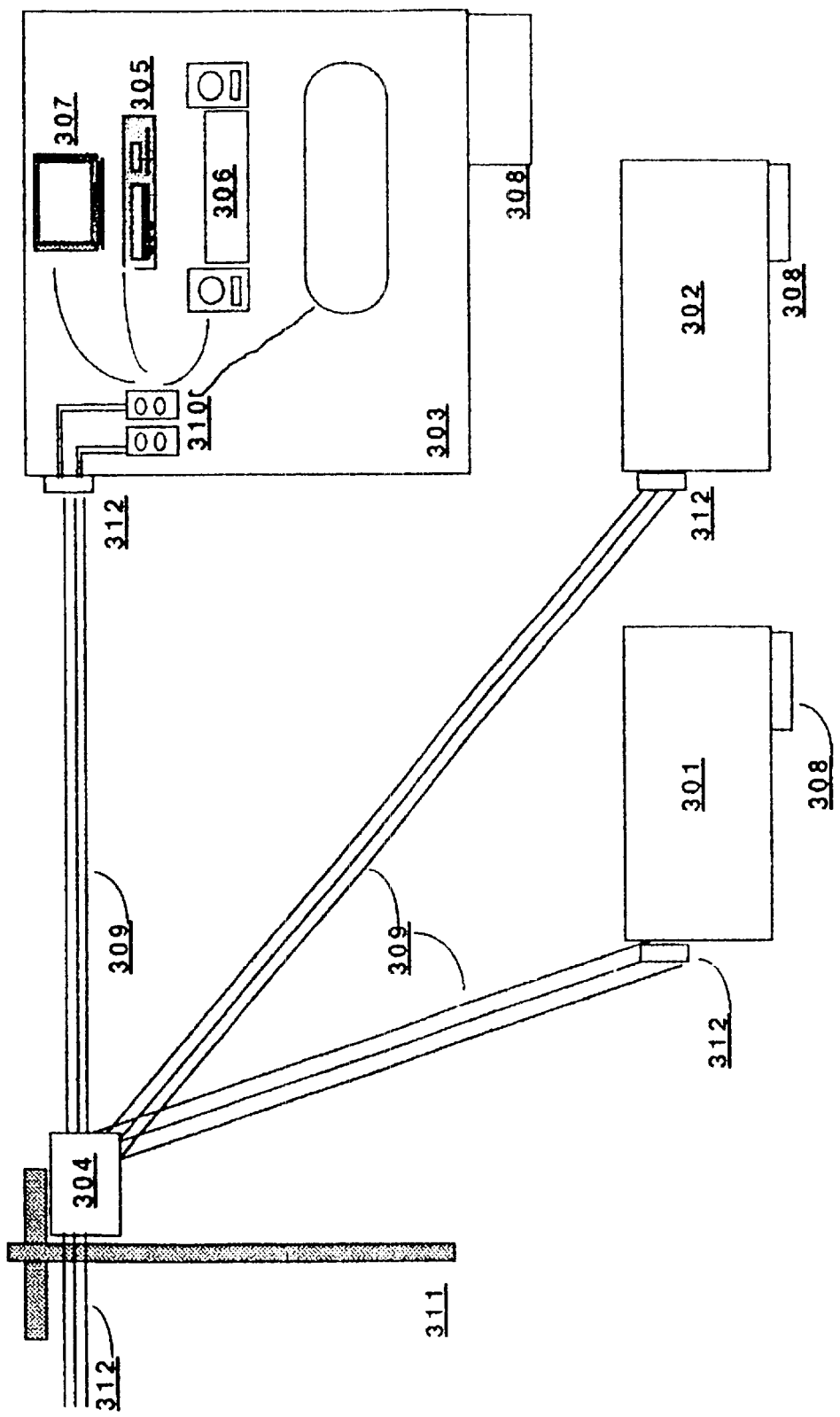
FIG. 4A is a generalized, schematic illustration of exemplary homes electrically connected to a exemplary power transformer exemplifying a typical neighborhood situation, with the third home showing an exemplary room with A/C electrically powered home entertainment components, including audio equipment and TV and an air conditioner ("A/C") as exemplary electrical device loads; while FIG. 4B generally illustrates in schematic form the basic circuitry or electrical equivalence of the "neighborhood" example of FIG. 4A.
Figure 4B:
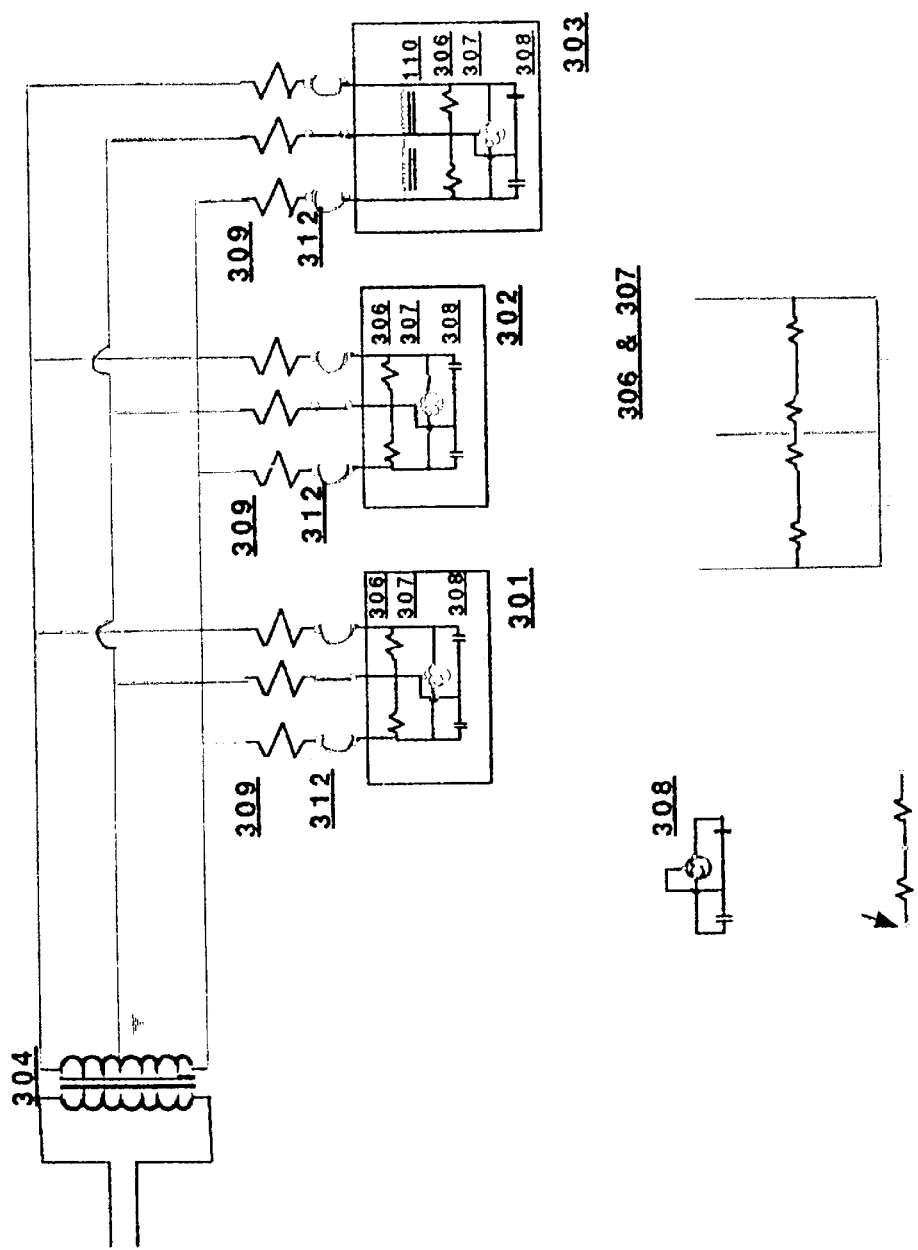
Figure 5A:
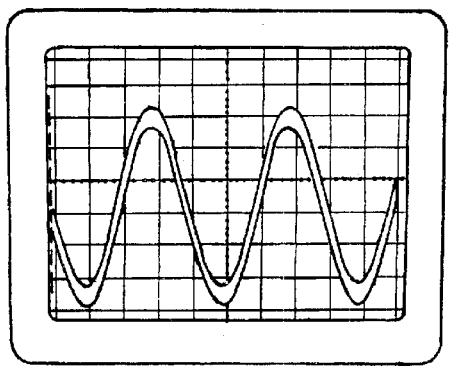
Figure 5B:
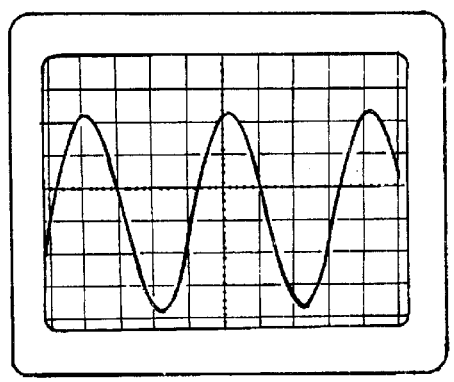
FIG. 5B is a like frontal view of the oscilloscope screen showing the exemplary AC line modulated with the same RF as in FIG. 5A, but with a further exemplary embodiment of the invention attached to the AC circuit.

The components 306/307 are plugged into standard A/C, three prong, one hundred and ten (110 v) volt, A/C wall outlets 310, while the air conditioner 308 is directly wired into the A/C house wiring, usually through a breaker or fuse box (not illustrated but well known in the house wiring electrical art), off of, for example, the combined two hundred and twenty (220 v) volt lines, using both "hot" lines as illustrated in FIG. 4B. The distance between the utility power transformer 304 and the wall outlet 310, measured by the total amount of wire electrically between them, varies greatly, but typically there is a significant distance of the order of at least about fifty (50') feet between the power transformer and the electrical device load, and sometime substantially more. The choke coil 110 substantially reduces, if not eliminates, the resistive effects of the combined wiring between the electrical device load (e.g., components & air conditioner 306–308 ) and the transformer 304.

Thus, as can be seen in the generalized illustration, an exemplary neighborhood 300 includes a number of homes

[an exemplary three (3) homes being shown for general illustrative purposes], with, as is well known, the home service wires 309 going from a utility transformer 304 on a power pole 311 (or other ground-type transformer) fed by the power transmission lines 312. The service wires 309 terminate in one or more metered breaker boxes 312, from which the house wiring extends to the exemplary wall outlets 310 for plugging in, as may be desired by the home occupants, various electrical components, appliances and the like, such, as for example, the home entertainment audio components 306 and TV 307 generally illustrated. In the use of the present invention for a situation such as that illustrated in the room 305, the exemplary embodiment 110 of FIG. 2 is plugged directly into the A/C wall box 310 using the wall plug 101 with, for example, the audio components 306 and TV 307 plugged directly into the receptacle(s) 103 of the unit 110 rather than in the wall plug 310.

FIG. 4B generally illustrates in schematic form the basic circuitry or electrical equivalence of the "neighborhood" example of FIG. 4A and like reference numbers are used in both illustrations. However, for further illustrative purposes, two "Power Company"™0 units 110 of the invention are used along side each other, each being plugged into the wall outlet in house 303 with the audio components 306, TV 307 and air conditioning unit 308 are plugged into it, allowing them to enjoy the high quality A/C input power provided by the invention; while in the first two houses 301 & 302 the components, TV and air conditioning unit are plugged directly into the house wiring subject to all of the A/C power input problems discussed above.

Contrary to accepted doctrine, the inventor has found that the A/C line feed from the utility transformer 304 to a good, high current, moderately clean source of power. The use of the present invention effectively allows the user's components and electrical devices and appliances to see the same type of high quality, A/C input power they would "see" if they were in essence directly connected to the standard side of the utility transformer 304. The invention's great reduction, if not elimination, of the effective resistance of the wire from the transformer 304 to the components, etc., including the service wires 309 and the subsequent house wiring, and its great reduction, if not elimination, of equipment cross-talk, while providing an instant high current source for the components, etc., enables the components, etc., to operate in many instances at their maximum performance levels. The invention, in it preferred embodiment, essentially does much to remove the effects of resistance in the line.

The current, most recent exemplary embodiment of the invention, of the type of FIG. 1 and of the form shown in FIG. 2, included a coil 4/102 wound on a, for example, one and five-eights by one and five-eights (1⅝"×1⅝") inch coil form made from, for example, a Kraft paper material, with the coil including, for example, thirteen hundred and ten (1,310) turns of, for example, a nineteen (#19) gauge awg. copper magnet wire (e.g. NEMA MW-28). The layer insulation used between the layers of magnet wire was, for example, seven (7) mil. fiber. The lamination core 5 was, for example, IE-162 with, for example, a one and five-eights (1⅝") inch center leg width lamination of, for example, twenty-six (#26) gauge M50 grade, made to a stack dimension of one and five-eights (1⅝") inches.

These exemplary dimension and exemplary materials are, of course, subject to great variation.

Test Results (Published April 2001)

As noted above, in today's world of sophisticated electronics, there remains one factor that no one has been able to change: The relatively poor quality of AC power. AC power, when generated, is very pure but today's transmission systems (the wires, poles, etc.) are highly inefficient. These systems impose limitations on both the amount and quality of power delivered. Along the way, noise from users (which may manifest itself from subsonic to RF frequencies) is unavoidably imposed upon the line.

In addition to this noise, loss in the form of heat is also unavoidable, further degrading the performance of electronic equipment. There are many line-operated apparati with switch mode power supplies (computers, televisions, etc) as well as, for further example, air conditioning compressors, which produce noise and cross-talk. They are constantly cycling on and off, not only in the home but in those of the neighbors' on the AC line ahead of the home, all of which contribute to degradation of the AC line. This heavily loaded and possibly "noisy" line can degrade the audio and its home theater system's performance. In a perfect world one could plug directly into the utility company's transformer to overcome these problems.

The present invention's solution to these problems is unique in that the massive inductor coil is in parallel to the line instead of the traditional series concept. The preferred embodiments preferably use no air core chokes, capacitors or any active circuitry. This provides nearly instantaneous noise reduction, as well as energy storage/release when needed.

To the inventor's knowledge, the invention's preferred embodiments are the only reactive electronic interface that effectively serves as an "electronic flywheel."

The preferred design of the present invention comprises one of the largest inductors, surrounding a unique core structure. Moreover, the parallel technology provides a "straight through" path for the power to reach the load components.

This power is aided greatly by the transient energy stored in its unique core. Since the preferred embodiments are unique, so is the challenge to demonstrate its effectiveness in an empirical fashion. With more than 3,000 commercial units already in use as of April 2001, it apparently is clear to these users that the invention works.

Striving to provide to future users of the invention's preferred embodiments with more empirical data, two renowned electrical engineers were retained. Combined with historical experience, both engineers quickly agreed that traditional testing methods would only reveal small benefits under "normal" static, steady state, testing (which, of course, is not representative of "real-world/in-use" conditions). Therefore, both engineers witnessed and performed both traditional and non-traditional objective tests to better explain just how the commercial embodiments of the invention's technology works in the "real world."

With reference to FIGS. 5A–8, the test results will now be described and discussed.

George Hero, BSEE, Tulane University, Engineering Counsel, inspected samples of the commercial embodiments, which were made in accordance with the foregoing teachings, and performed limited testing of the unit. Additionally Mr. Hero witnessed and participated in some of the tests performed by the inventor. Mr. Hero describes the commercial unit as "an inductor across the line (which) provides a small reactive current to the line. A classical analysis would indicate that this would have little effect on the larger load currents associated with the connected equipment.

However, a manufactured device has other characteristics that affect performance. A real world reactor has interwinding capacitance, eddy currents in the laminations, saturation effects and hysterisis losses. They are nonlinear for both voltage and frequency variations.

The line circuit feeding a receptacle has impedance back to the voltage source. The National Electric Code allows 3% voltage drop to a load. The line impedances include resistance, inductance and capacitance. The line length also is a consideration at RF frequencies.

The typical users' electronic equipment now have nonlinear power supplies that introduce harmonics into the line current. There are also induced voltages from frequencies associated with the devices. These include harmonics of the power supply, video sync signals, video sweep frequencies, color burst frequencies, intermediate frequencies, local oscillator and RF frequencies. These may be induced and reradiated to other equipment.

A parallel load across the line will have various impedances at these -frequencies from the internal winding and core configurations. The shunt impedances can reduce spurious line frequencies in a manner that is not amenable to classical circuit analysis. In this case it was noted that, when higher frequencies were introduced into the line voltage, the attenuation of the upper frequencies was not linear with frequency changes. Changes in operating conditions also introduce transients into the system that affect core saturation.

The interaction of these various linear and nonlinear effects with the line impedance and signal cabling is difficult to simulate in a laboratory condition, but they may have considerable effect on the performance of any one application. Objective testing with the equipment actually used in a particular system, will provide the best evaluation of benefits from using this product."

Drawing from this, it was agreed by the engineers that pulse testing was the answer to many questions, as the unit works similar to an AC line (that is, cycle to cycle).

With this knowledge, a basic demo, nicknamed "The Edison Test" was conceived and demonstrated. The Edison Test "charges" the core magnetically and, when the supply is removed, the magnetic field collapses. This results in showing that, once charged with a 12-volt lantern battery, the commercial unit can momentarily illuminate a 120-volt light bulb.

Accepting this challenge, a new experiment was derived using an RGPC in a testing harness to demonstrate its ability to discharge into a load.

Mr. Dean Klinefelter, a recording engineer and proprietor of Professional Systems Engineering for the past 28 years submitted the following findings:

"The first time I tested an RGPC unit I was having a hard time measuring information that was of enough magnitude to be easily seen on the test equipment. I then tried some empirical tests using the standard hook up. The AC line power for the system was on the stiff side as compared to most home situations. I was able to hear some subtle improvements, after which I changed the AC line power. I set up an AC power source, a big power amplifier with an output transformer designed for 120-volt output which is totally isolated from the power line. I tried three different sizes, the largest rated at 1000 out, with a line regulation of 0.1% (a big guy weighing in at 150 lbs.) and running on 240 volts, the medium size at 500 watts, and the small one at 350 watts running on 120 volts. I discovered that the smallest AC source had the most improvement with the (commercial) unit on line. At this point I was convinced that this was one of those audio improvements that would be hard to measure.

The idle current is about 0.006 amps, the spectrum of currents shows it absorbs current from the distortion harmonics of the power line. This would give some filtering action. I also monitored the spectrum while driving the amplifier with various musical signals. Again, the results were subtle.

After experiencing the results of Richard Gray's (the inventor's) Edison Test I tried to think of a test that would exploit the virtues of the (commercial) unit. I felt it must lie in the area of asymmetrical waveforms. This would tap into the low DC resistance of the choke.

This set up used an audio amplifier driven by a pulse type waveform. I saw some waveforms that seemed to indicate some DC-like current shift.

With a need for more visible results I loaded the AC power line with a 75 watt halogen lamp that has a diode so it only conducts one half of the AC Line. I now had measurable results that I felt correlated with the empirical results.

If I raise the line impedance the effects are great and parallel (commercial) units would cut the DC resistance in half and give a doubling effect, which correlates with user experiences.

Oscillograph of the (commercial unit) in the test harness with a turn on load of a large induction motor (note FIG. 7B). Note that the pulse is in the opposite direction of the normal wave, indicating the (commercial unit's) attempt to aid in the starting of the motor.

The effects of (the commercial unit) on the power line are in several areas:
1. The (commercial units) suppress DC like effects from the lamps as described above. This result will be felt in and other electronics that commonly use half wave rectifiers such as TV monitors and computers, also many appliances which produce random asymmetric wave forms clipping when starting and voltage surges when shutting off.
2. Absorbing currents like these will reduce secondary effects such as harmonic fields in power transformers (especially toroidal types). These fields are induced into internal circuits and produce effects from buzzes to bad sound.
3. Signals between both audio and video products often use unbalanced cabling, thus any line currents coupled to the chassis from the power supply can produce a degradation of signal. The FFT signal analysis shows how much the harmonics are absorbed thus reducing the potential of ground modulation between products.
4. Audio amplifiers also produce some signals in this area. If you have a very stiff and clean AC power the results would be minimal but in the real world rarely is power that good.
5. Provide limited attenuation to symmetrical power line distortion and noise."

Figure 7:
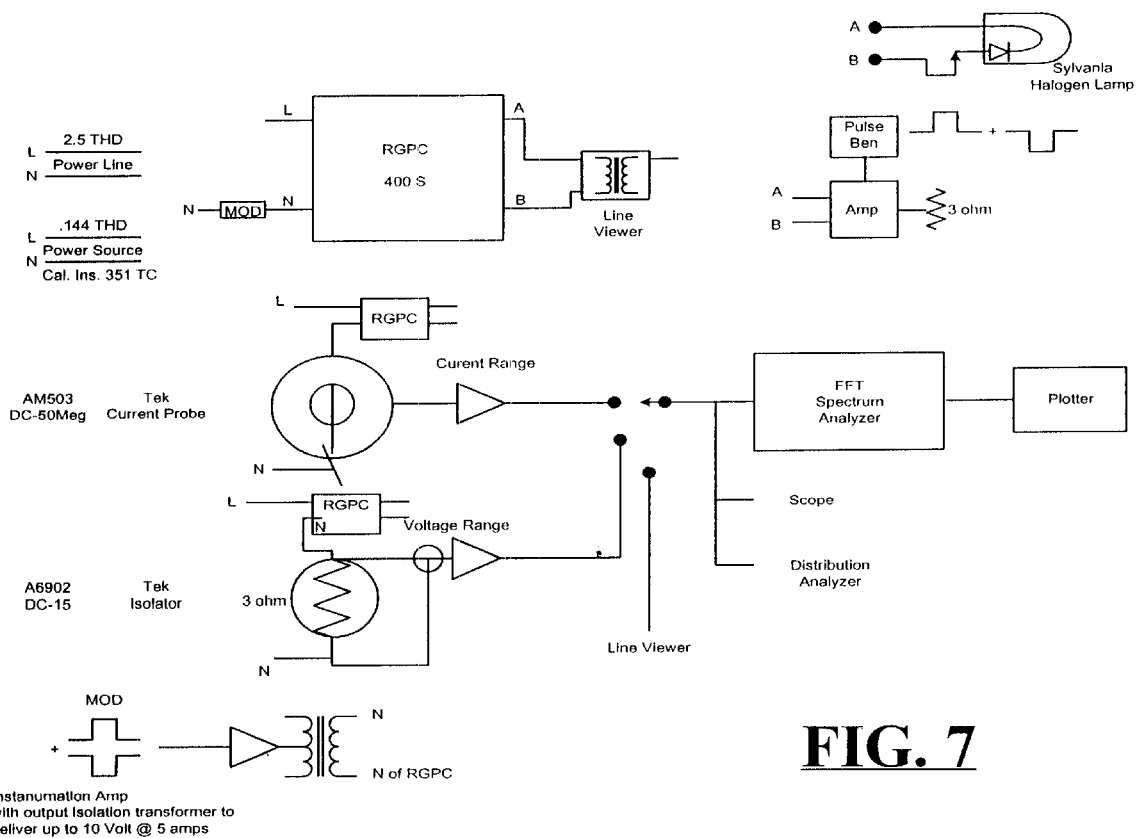
FIG. 7 is a schematic diagram showing one of the test's parameters, schematics and spectrum analysis as conducted on the further, preferred embodiment (commercial unit) by Mr. Dean Klinefelter.
Figure 8:
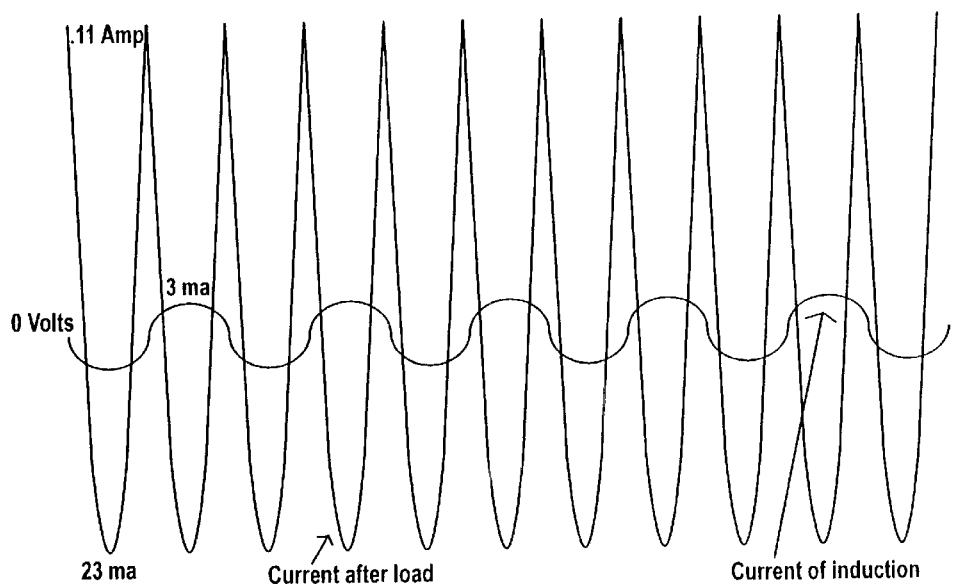
FIG. 8 are graphs showing the test results of the tests done by Mr. Klinefelter with the test circuit set-up of FIG. 7.
Figure 8:
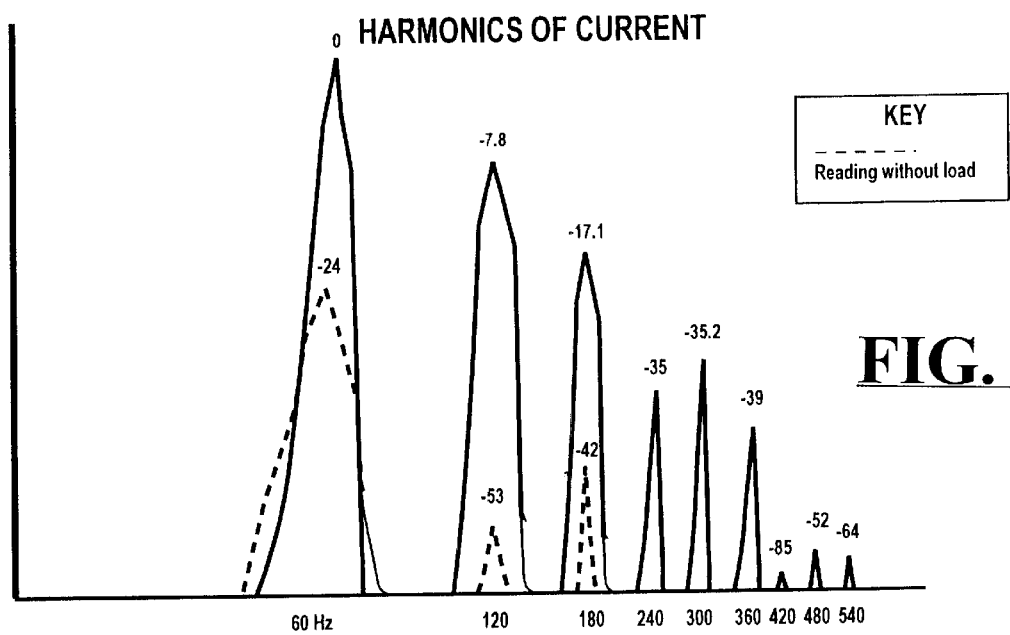

Mr. Klinefelter's parameters, schematics and spectrum analysis of his test set-up are illustrated in FIG. 7, it being noted that "RGPC" stands for the "RICHARD GRAY'S POWER COMPANY"™ commercial unit (Model 400S which is comparable to the exemplary embodiment of FIG. 2 with four sockets 111 weighing over twenty pounds, primarily due to the weight of the inductor 4/5); while FIG. 8 includes two graphs showing the test results of tests done by Mr. Klinefelter.

Figure 6A:
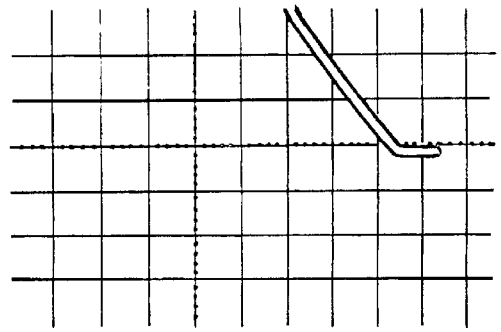
FIG. 6A is a frontal view of an oscillograph screen showing the energy storage and release produced by the further, exemplary embodiment (commercial unit) of the invention and having the ability to optimize performance of associated electronic and electronic equipment.
Figure 6B:
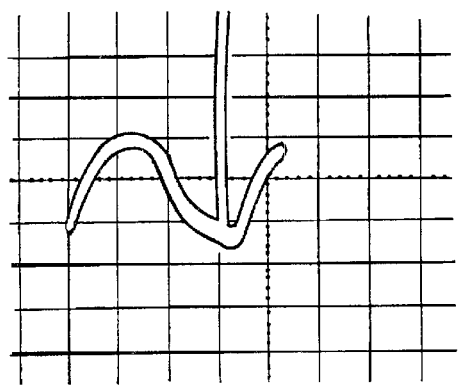
FIG. 6B is a like frontal view of a like oscillograph screen showing the characteristics of the trace signal with the further exemplary embodiment (commercial unit) of the invention in the test harness with a turn-on load of a large induction motor, with the pulse going in the opposite direction of the normal wave, indicating the embodiment's attempt to aid in the starting of the motor.

It is noted that the oscillograph's trace signal of FIG. 6A shows the energy storage and release produced by the further, exemplary embodiment (commercial unit) of the invention and its ability to optimize performance of associated electronic and electronic equipment; while the oscillograph trace signal of FIG. 6B shows the results of the further exemplary embodiment (commercial unit) in the test harness with a turn-on load of a large induction motor, with the pulse going in the opposite direction of the normal wave, indicating the embodiment's attempt to aid in the starting of the motor.

Figure 6C:
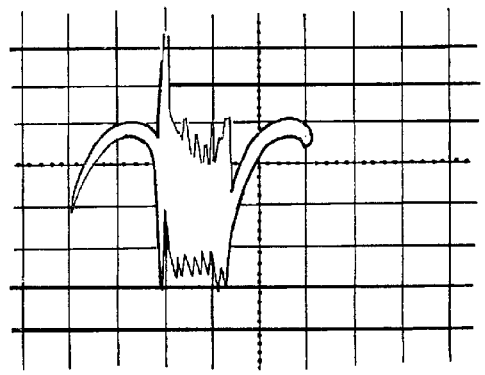
FIG. 6C is a further, like frontal view of a further oscillograph screen showing the characteristics of the trace signal with the further exemplary embodiment (commercial unit) of the invention in the test set-up showing the ability to absorb the spike or arc produced signal from a large motor being turned off.

It also is noted that FIG. 6C shows the characteristics of the measured trace signal using the further exemplary embodiment (commercial unit) of the invention in the test. The "smeared" portion of the trace between the regular sine wave's going down to the sine wave going up to the right shows the unit's ability to absorb the spike or arc produced signal from a large motor being turned off. If there were no ability for absorption by the invention's embodiment, the trace would remain unchanged. The signal was measured across a one (1) ohm resistor placed in series with the commercial unit.

Test Conclusions

An inductor is a reactive component when used under alternating current conditions. It resists changes in current flow in the circuit by storing energy in a magnetic field. When current flows through the inductor, a magnetic field builds up in the core and around the coil. When this current ceases, the magnetic field collapses and returns the stored energy to the circuit. Simply put, this effect is very much like that of a flywheel used in mechanical equipment.

What makes the preferred embodiments and the commercial unit unique are their ability to "fill in" the AC Line when demand momentarily overcomes supply and tends to "even out" small line anomalies. This process quenches the harmonic "fingerprint" of the equipment to which it is connected.

Although small, this fingerprint degrades the reproduction, and interaction quality of, for example, audio/video equipment.

As stated by Dean Klinefelter, multiple commercial units paralleled within a system "cuts the DC resistance in half and gives a doubling effect, or tripling effect when three units are used." This unique feature allows the user to "fine tune" the requirements of the individual system. It is of modular design, so multiple units may be placed where they are most needed and on different dedicated AC circuits. In many systems, the amplifiers and powered subwoofers are located across the room away from the source components, so dedicated clusters can be more desirably placed.

The commercial unit, like the preferred embodiments, through their surge protection system, negates the need for an additional surge protector. It is designed to blow its internal fuse (note, e.g., fuse 107 of FIG. 2), whenever a surge greater than, for example, 280 volts hits the system. It also is very effective at quenching small anomalies of pulses even before any metal oxide varistor (MOV) type of suppression would occur.

It is noted that the embodiments described herein in detail for exemplary purposes are, of course, subject to many different variations in structure, design, application and methodology. Because many varying and different embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense.

What is claimed is:

1. In an alternating current (A/C), electrical powered system, including an incoming A/C power source line having at least three conductors, a "ground" line conductor, a "neutral" line conductor and a "hot" line conductor, powering at least one electrical device load, the improvement comprising:

a massive electrical choke coil placed in parallel with the A/C source line, across the A/C power source line's "hot" and "neutral" line conductors between the electrical device load and the A/C power source line, quenching the reflected back emf signal that develops when the electrical device load places its demands upon the incoming A/C power source line.

2. The improvement of claim 1, wherein:

the load is located in a building having internal, A/C electrical wiring; and wherein there is further included:

a utility power transformer, with the A/C power source line being connected to the power transformer and being driven by the power transformer to produce the A/C on the power source line; and wherein:

there is a significant distance of the order of at least about fifty (50') feet between the power transformer and the electrical device load;

said choke coil substantially reducing, if not eliminating, the resistive effects of the wiring between the electrical device load and the power transformer.

3. The improvement of claim 1, wherein:

said choke coil is contained in a separate housing, with a wired A/C plug extending out of one side connected to the A/C power line source through a wall socket, and with an A/C socket being located on an exterior surface of said housing, the electrical device load being plugged into said A/C socket.

4. The improvement of claim 1, wherein:

the device load includes a housing, said choke coil being contained in said housing.

5. The improvement of claim 1, wherein:

said choke coil has an inductance greater than about three (3) henries.

6. The improvement of claim 1, wherein:

said choke coil has a core of magnetic material in the form of an "EI" core.

7. The improvement of claim 1, wherein:

said choke coil has a core of magnetic material in the form of a torroidal-type core.

8. The improvement of claim 1, wherein:

said choke coil has a low internal resistance of less than about one hundred (100 Ω) ohms.

9. The improvement of claim 8, wherein:

said choke coil has an internal resistance of about eleven (11 Ω) ohms.

10. The improvement of claim 1, wherein:

said choke coil has at least a thousand turns of wire.

11. A method of improving the quality of A/C power input to an electrical device load being powered from an A/C power source line having at least three conductors, a "ground" line conductor, a "neutral" line conductor and a "hot" line conductor, comprising the following step:

placing a massive electrical choke coil in parallel with the A/C power source line, across the A/C power source line's "hot" and "neutral" line conductors between the electrical device load and the A/C power source line, quenching the reflected back "emf" that develops when the electrical device load places its demands upon the incoming A/C power source line.

12. The method of claim 11, wherein there is included the step of:

using a choke coil having a core of magnetic material.

13. The method of claim 11, wherein:

the electrical device load is located in a building having internal, A/C electrical wiring, there is further included a utility power transformer, with the A/C power source line being connected to the power transformer and being driven by the power transformer to produce the A/C on the power source line, there being a significant distance of the order of at least about fifty (50') feet between the power transformer and the electrical device load;

wherein there is further included the step of:

using said choke coil to substantially reduce, if not eliminate the resistive effects of the wiring between the electrical device load and the power transformer.

14. The method of claim 11, wherein there is included the step of:

using a choke coil having an inductance greater than about three (3) henries.

15. The method of claim 11, wherein there is included the step of:

using a choke coil having an internal resistance of less than about one hundred (100 Ω) ohms.

16. The method of claim 15, wherein there is included the step of:

using a choke coil having an internal resistance of about eleven (11 Ω) ohms.

17. The method of claim 11, wherein there is included the step of:

using a choke coil having over a thousand turns of wire.

18. In an alternating current (A/C), electrical powered system, including an incoming A/C power source line having at least three conductors, a "ground" line conductor, a "neutral" line conductor and a "hot" line conductor, powering at least one electrical device load, the improvement comprising:

a massive, electrical inductive coil with a magnetic material core placed in parallel with the A/C source line, across the A/C power source line's "hot" and "neutral" line conductors between the electrical device load and the A/C power source line, quenching the reflected back emf signal that develops when the electrical device load places its demands upon the incoming A/C power source line.

19. The improvement of claim 18, wherein:

the electromagnetic characteristics of said massive inductive coil tend to provide a momentary high current source of energy when needed by the device load when transient demand signal is called for.

20. The improvement of claim 19, wherein:

the electromagnetic characteristics of said massive inductive coil also tend to have a reversing effect on the signal, at least substantially reducing the presence of the signal on the A/C line, providing a greatly enhanced A/C power line signal quality, without which the otherwise untreated signals would be able to modulate the A/C line.

21. The improvement of claim 18, wherein:

said inductive coil has two terminal coil ends; and wherein;

said terminal ends of said inductive coil are directly in electrical contact with the "neutral" line conductor and the "hot" line conductor.

22. The improvement of claim 18, wherein:

said massive inductive coil has two terminal coil ends; and wherein:

there is an absence of any capacitive element in series with said massive inductive coil between said terminal ends and the "neutral" line conductor and the "hot" line conductor.

23. The improvement of claim 18, wherein:

said massive inductive coil has at least a thousand turns of wire.

24. The improvement of claim 18, wherein:

said massive inductive coil has an inductance greater than about one (1) henry.

25. The improvement of claim 24, wherein:

said massive inductive coil has an inductance greater than about three (3) henries.

26. The improvement of claim 18, wherein said magnetic material core comprises a ferrous core.

* * * * *